(12) United States Patent
Lee

(10) Patent No.: US 10,331,772 B2
(45) Date of Patent: Jun. 25, 2019

(54) TERMINAL AND METHOD FOR CONTROLLING THE SAME

(71) Applicant: LG ELECTRONICS INC., Seoul (KR)

(72) Inventor: Jungsu Lee, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 0 days.

(21) Appl. No.: 14/902,789

(22) PCT Filed: Mar. 3, 2014

(86) PCT No.: PCT/KR2014/001727
§ 371 (c)(1),
(2) Date: Jan. 4, 2016

(87) PCT Pub. No.: WO2015/133657
PCT Pub. Date: Sep. 11, 2015

(65) Prior Publication Data
US 2016/0170946 A1 Jun. 16, 2016

(51) Int. Cl.
| G06F 17/00 | (2019.01) |
| G06F 17/22 | (2006.01) |
| G06F 3/0484 | (2013.01) |
| G06F 3/16 | (2006.01) |
| G06F 3/0481 | (2013.01) |
| G06F 9/451 | (2018.01) |

(52) U.S. Cl.
CPC ........ *G06F 17/2247* (2013.01); *G06F 3/0481* (2013.01); *G06F 3/04842* (2013.01); *G06F 3/167* (2013.01); *G06F 9/453* (2018.02)

(58) Field of Classification Search
CPC .. G06F 17/2247; G06F 9/4446; G06F 3/0481; G06F 3/04842; G06F 3/167
USPC ................. 715/234; 395/155, 156
See application file for complete search history.

(56) References Cited

U.S. PATENT DOCUMENTS

| 5,535,323 | A  | * | 7/1996  | Miller     | G06F 9/453 |
|           |    |   |         |            | 715/707    |
| 7,346,846 | B2 | * | 3/2008  | Rossi, Jr. | G06F 9/4446 |
|           |    |   |         |            | 715/705    |
| 9,183,306 | B2 | * | 11/2015 | Robarts    | G06F 17/30867 |
| 9,536,049 | B2 | * | 1/2017  | Brown      | G06F 19/345 |
| 2010/0281374 | A1 | * | 11/2010 | Schulz | G06F 3/0482 |
|           |    |   |         |            | 715/723    |
| 2011/0035675 | A1 | * | 2/2011  | Kim    | G06Q 10/10 |
|           |    |   |         |            | 715/745    |

(Continued)

OTHER PUBLICATIONS

Lardinois, "Google Now: There's a Fine Line Between Cool and Creepy", published Jul. 22, 2012, published by TechCrunch.com, located at https://techcrunch.com/2012/07/22/google-now-2/, pp. 1-7.*

*Primary Examiner* — Stephen S Hong
*Assistant Examiner* — Matthew J Ludwig
(74) *Attorney, Agent, or Firm* — Birch, Stewart, Kolasch & Birch, LLP

(57) ABSTRACT

A method for controlling an application in a terminal includes receiving a request for executing the application from a user, executing the application, outputting one or more pieces of guide data in a first area of a screen for the executed application based on context data of the terminal and controlling the application according to the user selection.

12 Claims, 14 Drawing Sheets

(56) References Cited

U.S. PATENT DOCUMENTS

| | | | |
|---|---|---|---|
| 2011/0239158 A1* | 9/2011 | Barraclough | G06Q 10/109 |
| | | | 715/808 |
| 2013/0013419 A1 | 1/2013 | Sim et al. | |
| 2013/0019174 A1* | 1/2013 | Gil | G06F 3/04812 |
| | | | 715/711 |
| 2013/0267215 A1 | 10/2013 | Rhim et al. | |
| 2013/0268865 A1* | 10/2013 | Rhim | G06F 3/0484 |
| | | | 715/751 |
| 2013/0297551 A1 | 11/2013 | Smith et al. | |
| 2014/0164953 A1* | 6/2014 | Lynch | G06F 3/0481 |
| | | | 715/753 |
| 2015/0150053 A1* | 5/2015 | Hardin | H04N 21/44222 |
| | | | 725/52 |
| 2016/0179787 A1* | 6/2016 | Deleeuw | G06F 17/2785 |
| | | | 704/9 |

* cited by examiner

TERMINAL AND METHOD FOR CONTROLLING THE SAME

TECHNICAL FIELD

The present invention relates to a terminal for enabling a user to conveniently use a service via an interactive agent and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In particular, most manufacturers provide an interactive service for configuring and providing an interactive user interface on a screen, outputting an initial guide message such as "May I help you?" or "What operation do you wish to perform?" and awaiting user input. In this case, although the interactive service is requested to be executed, the user may not remember information to be input and thus may hesitate to input desired information. In addition, when the user incorrectly inputs desired information after the interactive service is loaded, the user may obtain an undesired result.

SUMMARY OF THE INVENTION

An object of the present invention devised to solve the problem lies in a terminal for providing an adaptive agent for enabling a user to easily and conveniently use an interactive service and a method for controlling the same.

The object of the present invention can be achieved by providing a method for controlling an application in a terminal including receiving a request for executing the application from a user, executing the application, outputting one or more pieces of guide data in a first area of a screen for the executed application based on context data of the terminal and controlling the application according to the user selection.

The one or more pieces of guide data may be output without user input after executing the application.

The controlling the application may include switching the screen to a screen corresponding to selected guide data when the user selects the one or more pieces of guide data output in the first area.

The controlling the application may further include, when the user does not select the one or more pieces of guide data output in the first area, determining whether user input is received within a predetermined time and outputting one or more pieces of new guide data in the first area when it is determined that the user input is not received.

The guide data may include at least one of image, video, audio, text including one or more keywords or sentences, uniform resource locator (URL) data and a combination thereof.

The application may be executed by an intelligent agent and the application may include an application for an interactive service.

A user interface for an input tool for receiving the user input may be output in a second area of the screen for the application and voice or text data may be received from the user via the user interface for the input tool.

The context data may include a conversation history of the user, pattern data according to application and service use history analysis, pattern data according to use or selection pattern analysis of other users having similar tendency based on basic data about the user, location data of the terminal and one or more link terminals connected to or capable of being connected to the terminal and use pattern data of functions or applications used for a predetermined time before an interactive service is executed or a combination thereof.

The context data may include data for accessing a function or application which is used not once or is not used by a predetermined number of times by the user among functions and applications provided by or installed in the terminal, image, moving image and text data received from at least one link terminal connected to or capable of being connected to the terminal.

The method may further include collecting data regarding the terminal at an intelligent agent for the application.

In another aspect of the present invention, provided herein is a terminal for controlling an application including a receiver configured to receive a request for executing the application from a user, a controller configured to execute the application, to output one or more pieces of guide data in a first area of a screen for the executed application based on context data of the terminal and to control the application according to the user selection and an output unit configured to output the screen for the executed application and the guide data.

The controller may output the one or more pieces of guide data without user input after executing the application.

The controller may switch the screen to a screen corresponding to selected guide data when the user selects the one or more pieces of guide data output in the first area.

When the user does not select the one or more pieces of guide data output in the first area, the controller may determine whether user input is received within a predetermined time; and output one or more pieces of new guide data in the first area when it is determined that the user input is not received.

The guide data may include at least one of image, video, audio, text including one or more keywords or sentences, uniform resource locator (URL) data and a combination thereof.

The controller may execute and control the application via an intelligent agent and the application includes an application for an interactive service.

The controller may output a user interface for an input tool for receiving the user input in a second area of the screen for the application and receive voice or text data from the user via the user interface for the input tool.

The context data may include a conversation history of the user, pattern data according to application and service use history analysis, pattern data according to use or selection pattern analysis of other users having similar tendency based on basic data about the user, location data of the terminal and one or more link terminals connected to or capable of being connected to the terminal and use pattern data of functions or applications used for a predetermined time before an interactive service is executed or a combination thereof.

The context data may include data for accessing a function or application which is used not once or is not used by a predetermined number of times by the user among functions and applications provided by or installed in the terminal, image, moving image and text data received from at least one link terminal connected to or capable of being connected to the terminal.

The controller may collect the context data of the terminal at an intelligent agent for the application.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

The effects of the mobile terminal and the method for controlling the same according to the present invention will now be described.

According to at least one of the embodiments of the present invention, when an interactive service is used, a user can easily and conveniently use the interactive service via guide data without inputting voice and text.

According to at least one of the embodiments of the present invention, by providing guide data based on context data, it is possible to provide an adaptive interactive service in accordance with user's intention or needs.

The effects of the present invention are not limited to the above-described effects and other effects which are not described herein will become apparent to those skilled in the art from the following description.

BRIEF DESCRIPTION OF DRAWINGS

The present invention will become more fully understood from the detailed description given herein below and the accompanying drawings, which are given by illustration only, and thus are not limitative of the present invention, and wherein.

DETAILED DESCRIPTION OF EMBODIMENTS OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
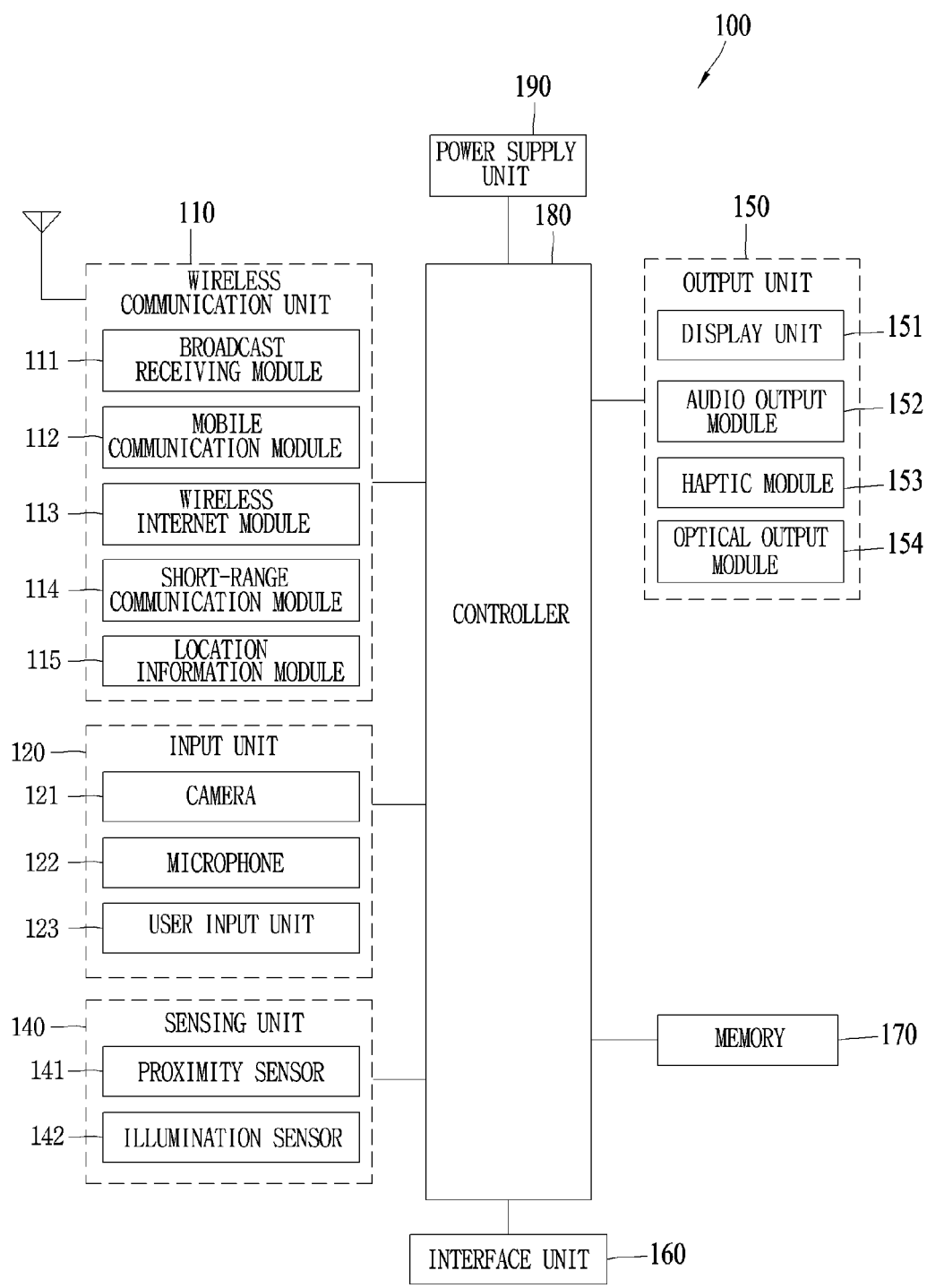
FIG. 1 is a block diagram of a mobile terminal in accordance with the present disclosure.
Figure 2:
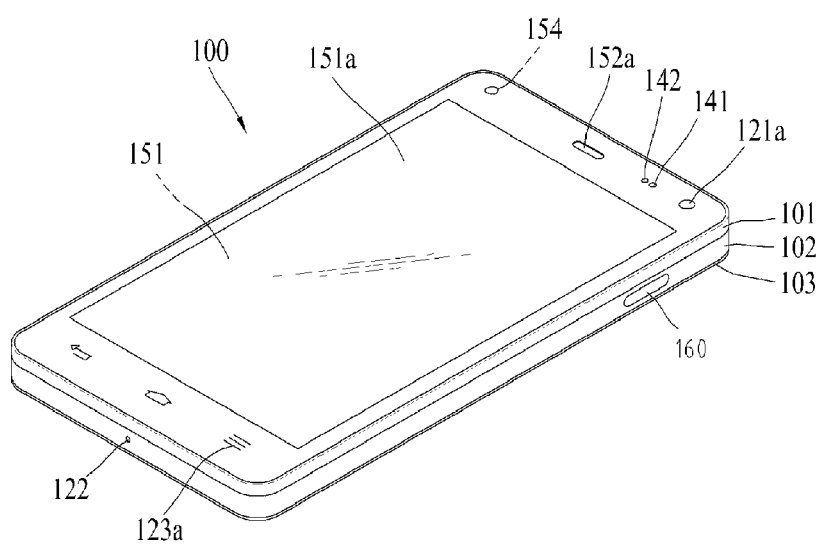
FIGS. 2 and 3 are conceptual views of one example of the mobile terminal, viewed from different directions.
Figure 3:
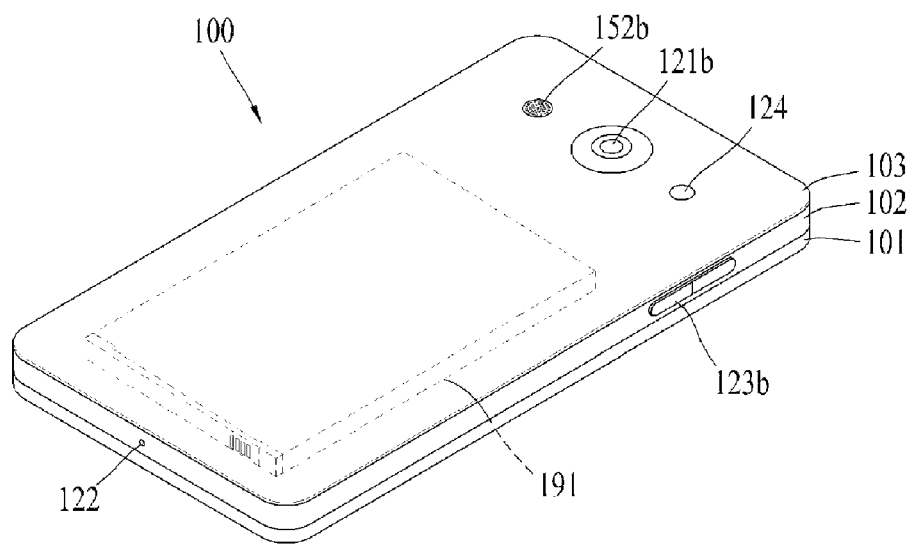

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), HSDPA, HSUPA, LTE, LTE-A, and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wi-Fi, Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as SIM, UIM, or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIGS. 2 and 3, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 4:
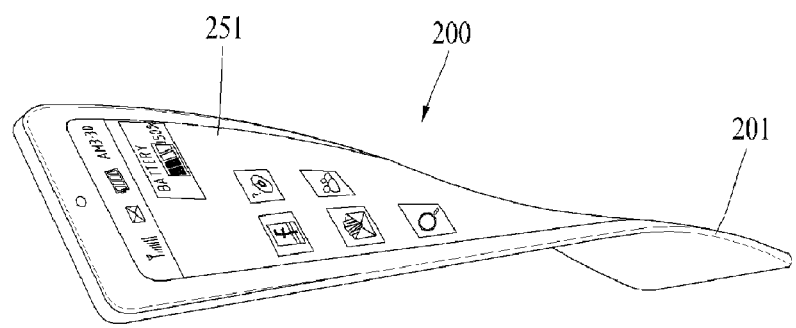
FIG. 4 is a conceptual view of a deformable mobile terminal according to an alternative embodiment of the present disclosure.

FIG. 4 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1-3.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a HMD, and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 5:
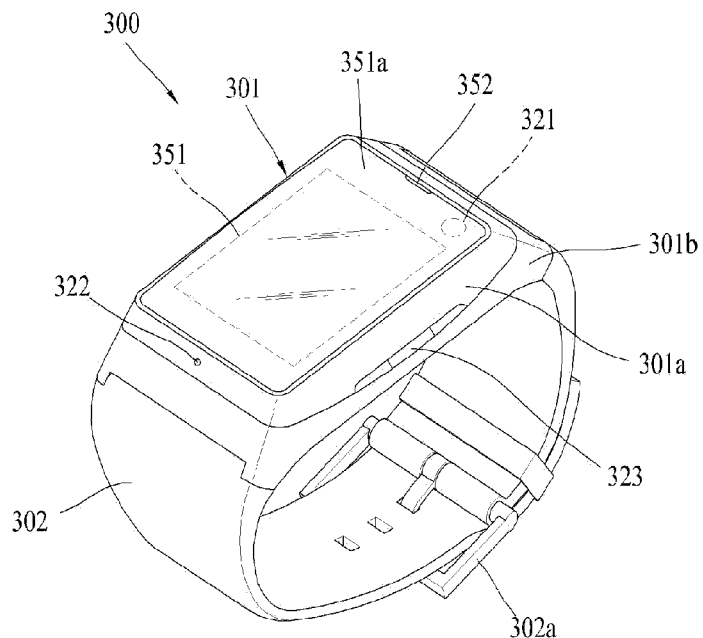
FIG. 5 is a conceptual view of a wearable mobile terminal according to another alternative embodiment of the present disclosure.

FIG. 5 is a perspective view illustrating one example of a watch-type mobile terminal 300 in accordance with another exemplary embodiment. As illustrated in FIG. 5, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1-3.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 6:
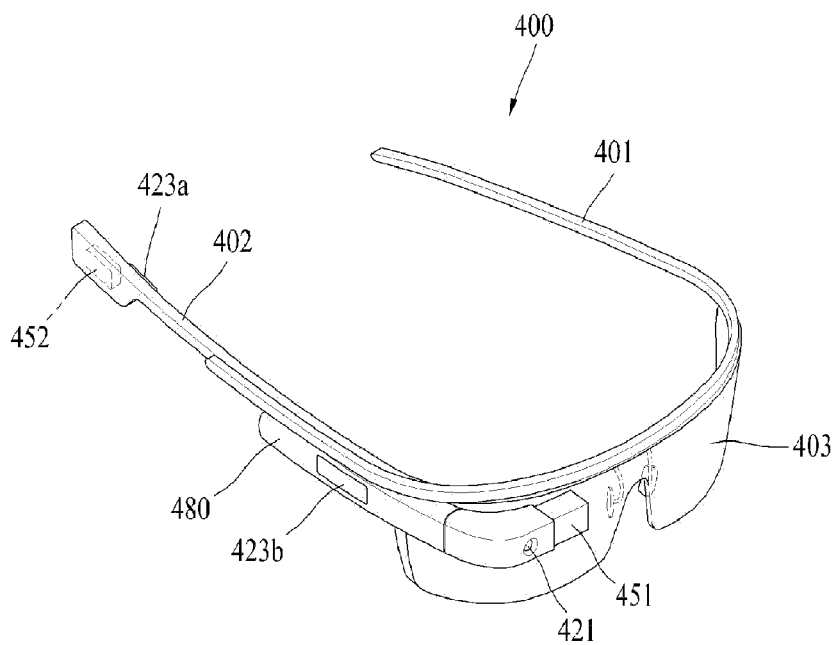
FIG. 6 is a conceptual view of a wearable mobile terminal according to another alternative embodiment of the present disclosure.

FIG. 6 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1-3.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 6 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 6 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), CDMA, Universal Mobile Telecommunications System (UMTS) (including, LTE, LTE-A), GSM, and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omnidirectional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

GPS satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a GPS module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The WPS refers to a location determination technology based on a WLAN using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless AP connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™ RFID, IrDA, UWB, ZigBee, NFC, Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a SIM or USIM), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

The terminal described in the present specification includes electronic apparatuses including a fixed terminal and a mobile terminal. In the present specification, the terminal may include a display screen for providing an interactive service to a user via an agent. The terminal according to the present invention may provide an interactive service to a user using another method, for example, using sound, even when the display screen is not included. Hereinafter, for better understanding of the present invention and convenience of description, assume that the terminal is a mobile terminal. Here, the mobile terminal described in the present specification may include a cellular phone, a smart phone, a laptop computer, a digital broadcast terminal, a PDA, a PMP, a navigation system, a slate personal computer (PC), a tablet PC, an ultrabook, a wearable device, etc. In addition, the wearable device may include a smart watch, smart glasses and a head mounted display (HMD), etc.

The mobile terminal described in the present specification may output data via an agent for an interactive service when providing an interactive service and share an environment for outputting the data with another terminal. For example, when a user who wears smart glasses executes an interactive service on a mobile terminal, service data provided by the mobile terminal may be determined based on data collected via the smart glasses worn by the user or a combination of data collected via the smart glasses worn by the user and data of the mobile terminal.

Hereinafter, embodiments of a method for controlling an application in a terminal will be described in detail with reference to the accompanying drawings.

Here, the application may include a native application embedded when the terminal is manufactured and applications downloaded and installed by a user. In particular, in the present specification, for better understanding of the present invention and convenience of description, the application is controlled by an intelligent agent to provide a service requested by a user. The service may be implemented via one application and an interactive service may be implemented when a user selects a specific button or an application icon. The service or interactive service according to the present invention is overlaid on a screen for the application while another application is executed so as to configure and provide a related screen and the service may be provided under control of the intelligent agent.

Figure 7:
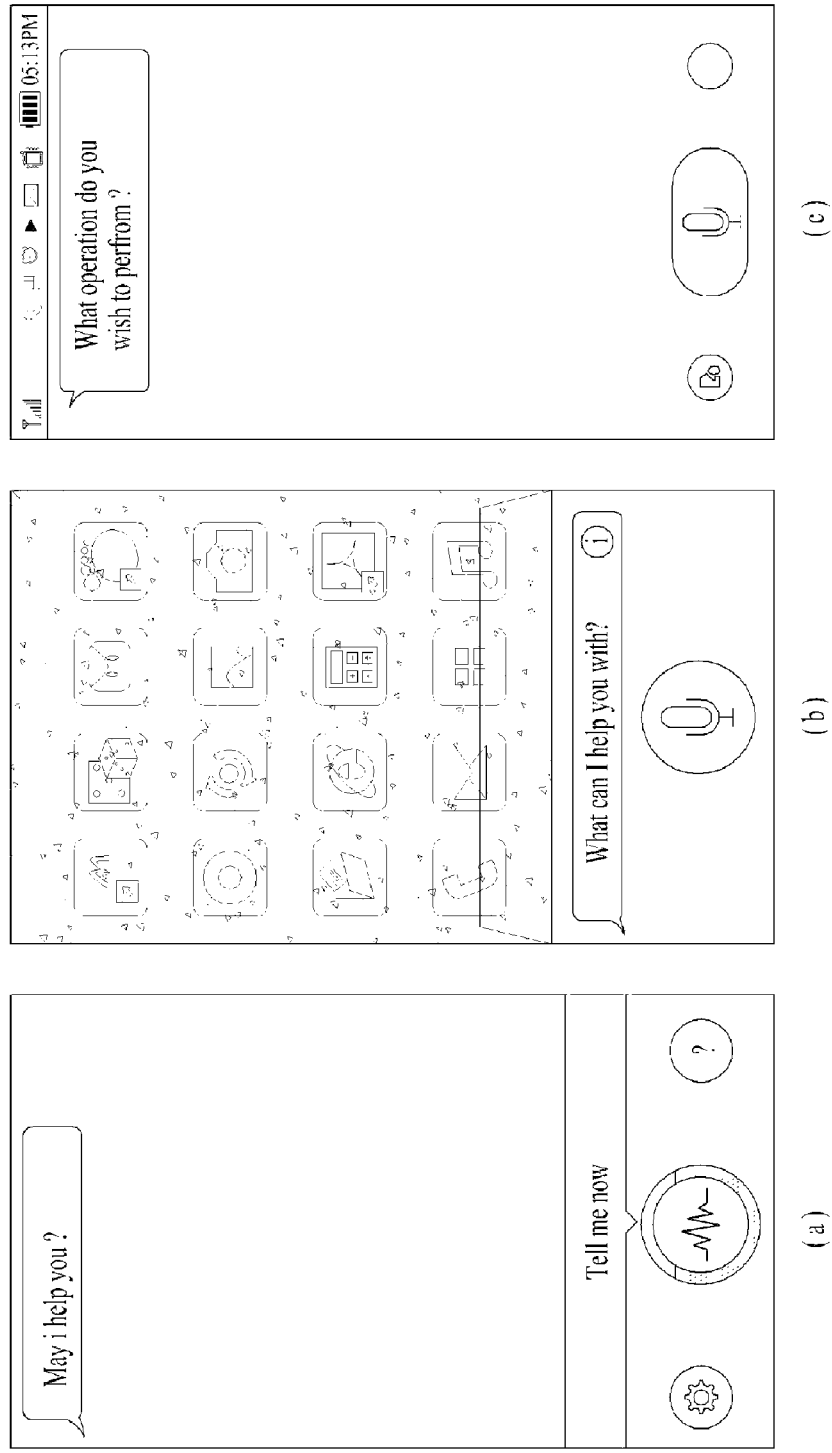
FIG. 7 is a diagram showing user interfaces of an embodiment of an interactive service provided by a mobile terminal according to the present invention.

FIG. 7 is a diagram showing user interfaces of an embodiment of an interactive service provided by a mobile terminal according to the present invention.

The user interfaces shown in FIG. 7 are initial screen configurations of an interactive service executed when a user of a mobile terminal selects an application, key button or icon for an interactive service.

Referring to FIGS. 7*a* to 7*c*, the user interfaces are configured and provided in various formats according to a manufacturer of the mobile terminal or an operating system (OS) of the mobile terminal.

Referring to FIGS. 7*a* to 7*c*, on the initial screens of the user interfaces for the interactive service, the service is provided using the substantially same method even when the manufacturers or the OSs are different, as described above.

For example, an initial message is provided in one area of the initial screen of the user interface in the form of text and a user interface for an input tool for receiving audio or text from a user is provided in another area. The initial message serves to indicate that the service is ready to be executed and user input is ready to be received while the service is loaded, such as "May I help you" or "What operation do you wish to perform?". Meanwhile, the user interface for the input tool may be implemented in the form of a microphone for receiving a voice command from a user or a virtual keyboard for text input may be provided according to user selection.

As described above, the initial message is mainly used to inform the user that the interactive service is ready to be used. That is, the initial message is not used to access an application according to user selection or to perform an additional function according to access of the application. In other words, the interactive service enables a next operation to be executed or enables related data to be output according to user input via the user interface for the input tool after outputting the initial message on the service screen of the terminal.

In the present invention, as described above, in the case in which a service screen is provided by executing an interactive service, one or more pieces of guide data configured according to the present invention are provided in one area of the screen even when user input is not received or when user input is received.

As described above, whether an interactive service is executed according to or regardless of user's intention, the user worries about how desired information is easily and conveniently acquired. For example, it is difficult for the user to know which keyword, sentence, voice command, etc. should be input in order to easily and conveniently acquire desired data when executing an interactive service. Accordingly, use of the interactive service by the user may be restricted.

Currently, an interactive service is provided based on user input. For example, when a voice command of a user is received via an interface for an input tool, the terminal changes the received voice command into text data and outputs data in a database corresponding to the changed text data, thereby aiding in user selection. In addition, if text data is used, the terminal reacts in real time via the user interface for the input tool in units of vowels and consonants input by the user. That is, keywords or sentences extracted from the database in real time according to consecutive input of vowels and consonants are provided on the screen of the terminal. Currently, the interactive service is only provided by user input. In other words, currently, the interactive service cannot be provided without user input.

In the present invention, in order to solve the problem of the current interactive service, although user input is not received, when the interactive service is loaded, guide data is provided to the user such that the user can easily and conveniently use the service.

Since the terminal provides guide data when the interactive service is loaded in a state in which user input for providing the interactive service is not received, the guide data is not suitable for user's intention or needs, causing inconvenience. Accordingly, in the present invention, in order to prevent user inconvenience, the terminal may collect context data and configure and provide guide data based on the collected context data, thereby providing an adaptive interactive service to the user. Accordingly, the user may easily and rapidly access a desired function, data, etc. without a specific keyword, sentence, gesture or voice command simply by selecting guide data provided together with a request for executing the interactive service.

Figure 8:
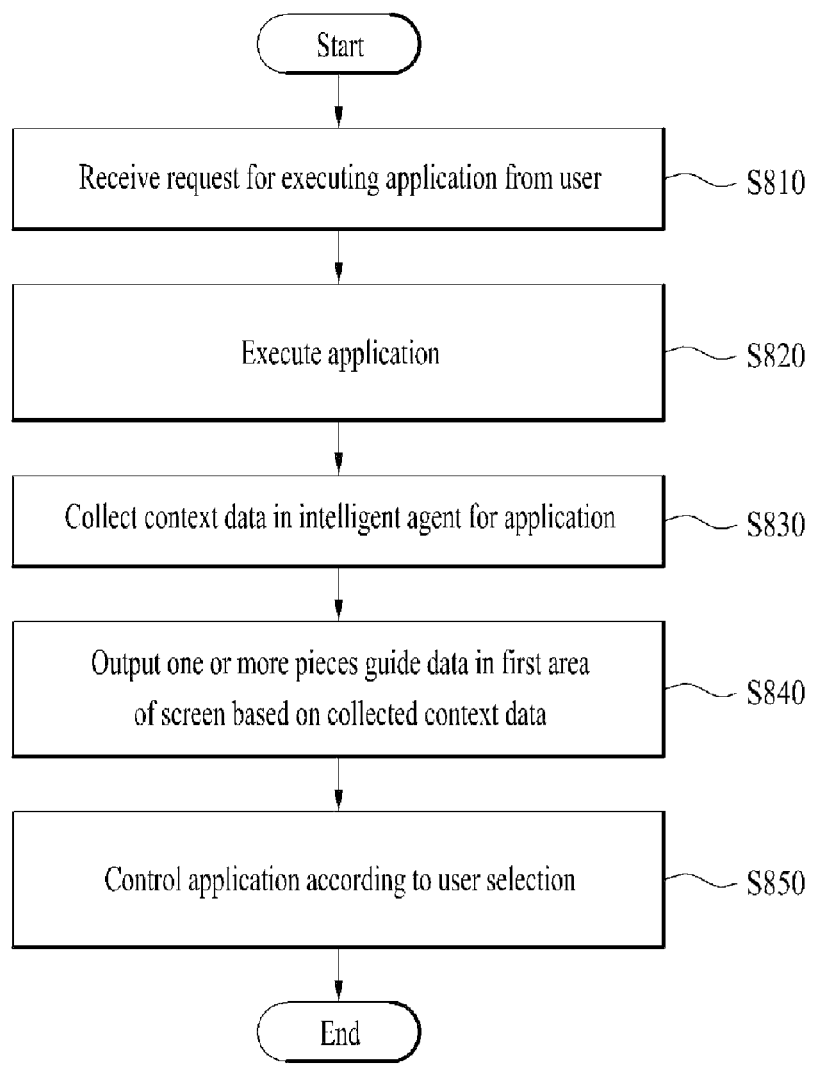
FIG. 8 is a flowchart illustrating a method for controlling an application in a terminal according to the present invention.
Figure 9:
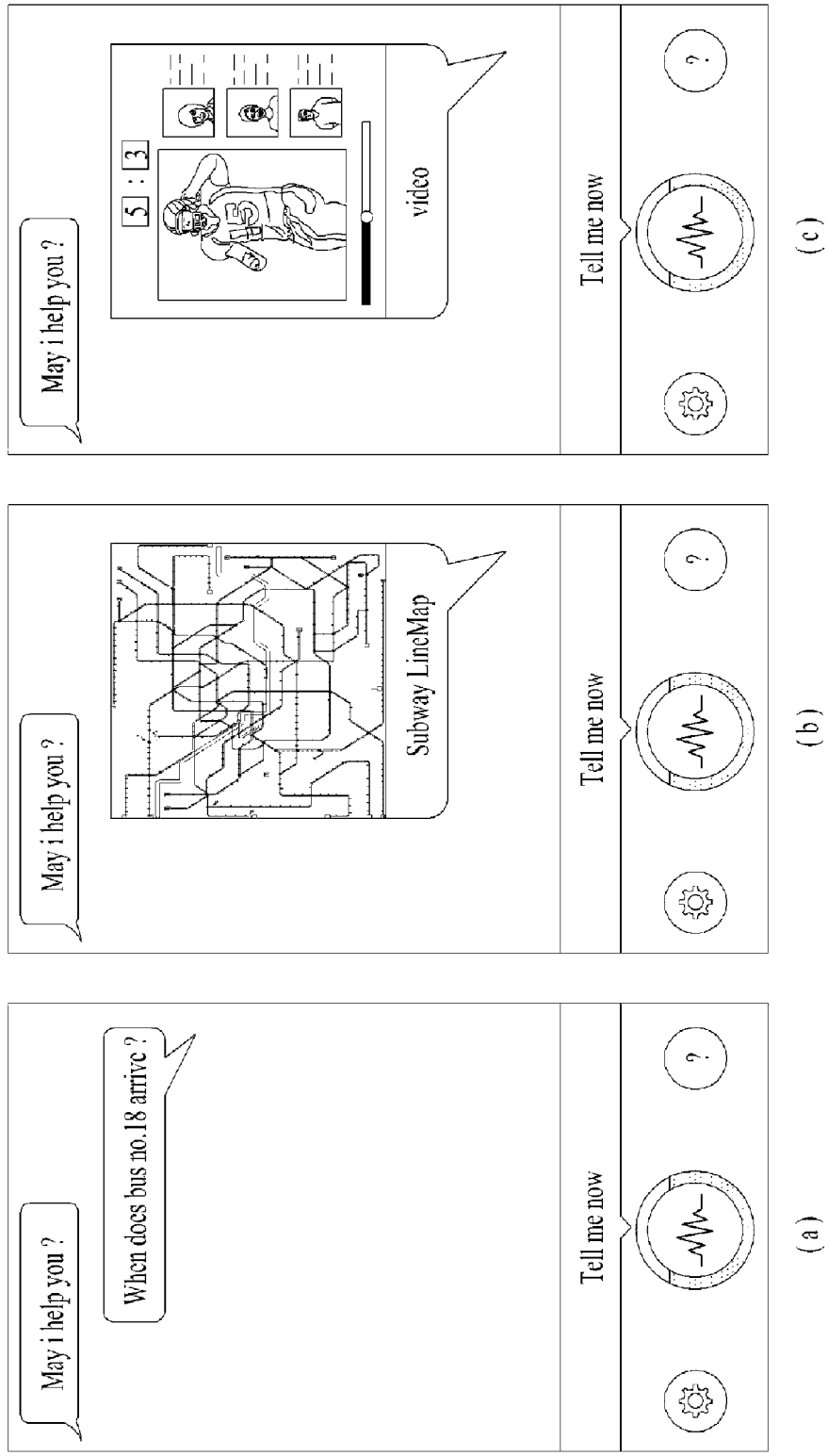
FIG. 9 is a diagram illustrating an embodiment of a configuration of a screen, on which guide data is output, of a terminal according to the method for the application of FIG. 8.

FIG. 8 is a flowchart illustrating a method for controlling an application in a terminal according to the present invention, and FIG. 9 is a diagram illustrating an embodiment of a configuration of a screen, on which guide data is output, of a terminal according to the method for the application of FIG. 8.

The terminal receives a request for executing an application (S810). The requested application may be an application for an interactive service according to the present invention.

The terminal executes the application according to the user request (S820).

According to execution of the application of step S820, an application execution screen is loaded on the screen of the terminal. The terminal collects context data for guide data to be provided on the application execution screen via a controller (S830), when or after the request for executing the application is received. The controller may manage a control process of the present invention via an intelligent agent.

The intelligent agent generates one or more pieces of guide data to be provided on the application execution screen based on the collected context data. The terminal outputs the generated one or more pieces of guide data in a first area of the application execution screen as shown in FIG. 9 (S840). The guide data may be provided in the text data form of FIG. 9a, the image data form of FIG. 9b or the video data form of FIG. 9c. Although not shown, at least two pieces of data of FIGS. 9a to 9c may be simultaneously provided on the screen.

After step S840, the terminal controls the application according to user selection (S850).

Figure 10:
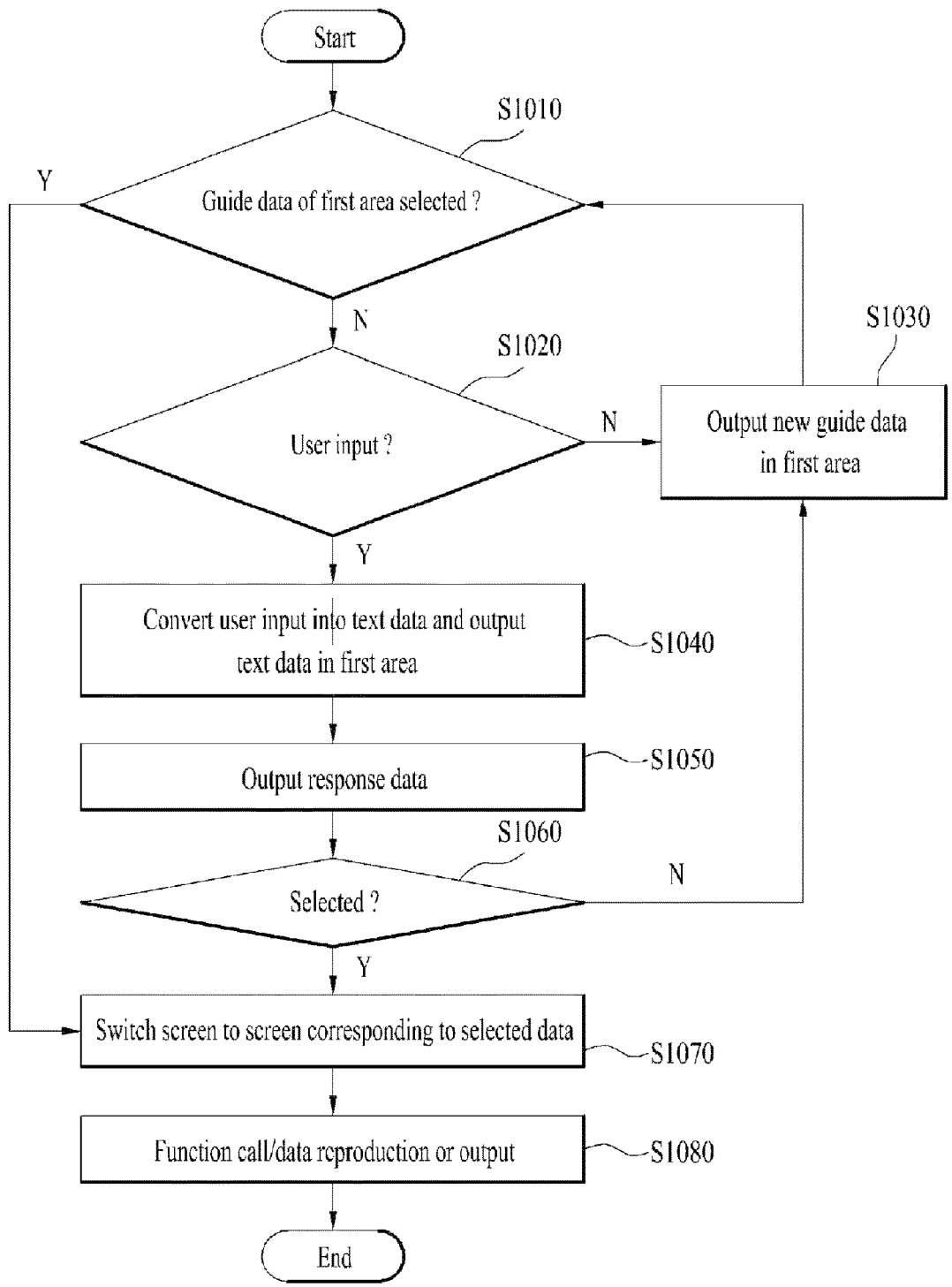
FIG. 10 is a flowchart illustrating a control process of step S850 of FIG. 8 in detail.
Figure 11:
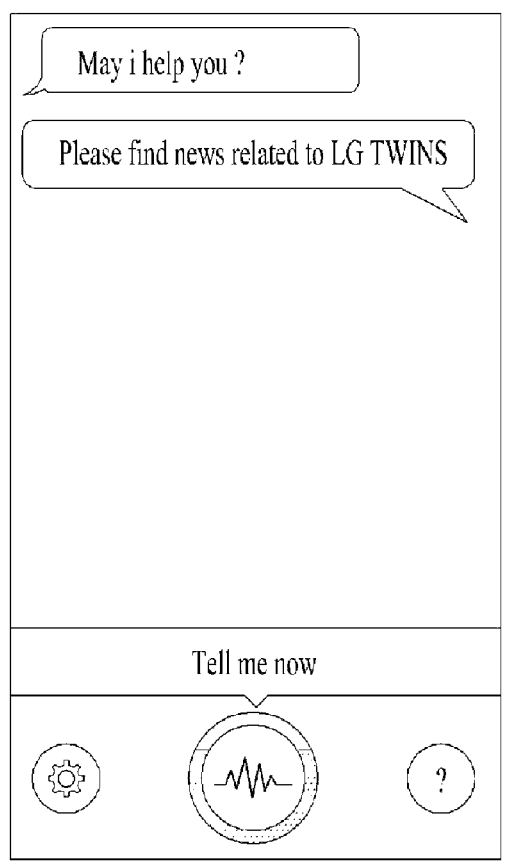
FIG. 11 is a diagram illustrating provision of new guide data different from the guide data of FIG. 9.

FIG. 10 is a flowchart illustrating a control process of step S850 of FIG. 8 in detail and FIG. 11 is a diagram illustrating provision of new guide data different from the guide data of FIG. 9.

As described above, in step S850, the terminal controls the application according to user selection. At this time, the application may be variously controlled according to user selection.

Hereinafter, a description of up to step S840 will be omitted in FIG. 10 and the controlling step of S850 will be described in detail.

When the guide data is output in the first area of the screen in step S840, the terminal determines whether the guide data output in the first area is selected via the intelligent agent of the controller (S1010).

As the determined result of step S1010, when a signal for selecting the guide data is received from the user, the controller configures and switches to a screen corresponding to the selected guide data (S1070). The controller calls a function of the switched screen and reproduces or outputs data on the switched screen (S1080). The data may include image, video, audio, text data, etc., as described above.

As the determined result of step S1010, when the signal for selecting the guide data is not received from the user within a predetermined time, the controller determines whether user input is received during a predetermined time (S1020).

As the determined result of step S1020, when user input is received, the controller converts user input into text data and outputs the text data in the first area of the screen (S1040). At this time, the guide data output in the first area of the screen may be removed or the output text data may be provided below the guide data. Priority or weight of the unselected guide data may be decreased and the unselected guide data, priority or weight of which has been decreased, may be referred to when a next interactive service is provided.

The controller outputs response data corresponding to the text data according to user input, which is output in the first area of the screen, in the first area of the screen (S1050). At this time, the response data is aligned and provided below the text data. One or more pieces of response data may be output based on attributes of the text data. In this case, the response data may be sequentially aligned and output based on priority, weight, etc.

Thereafter, the controller determines whether the output response data is selected (S1060).

As the determined result of step S1070, when at least one piece of response data is selected, the controller switches the screen to a screen corresponding to the selected response data (S1070) and performs function call, data reproduction or output on the switched screen (S1080).

When user input is not received during the predetermined time in step S1020, as shown in FIG. 11, the controller outputs new guide data different from the guide data previously output in the first area (S1030). The guide data is reconfigured in consideration of step S1010 and/or step S1020. In other words, context data for the guide data provided in step S840 and context data for guide data provided in step S1030 may differ. This is because new guide data may coincide with user's intention or needs. For example, when the user performs another operation within a short time, steps S1010 to S1020 may be performed again by resetting time information via an eye tracking center from the moment when the user handles the terminal again.

Hereinafter, context data for guide data provided according to the present invention will be described.

Figure 12:
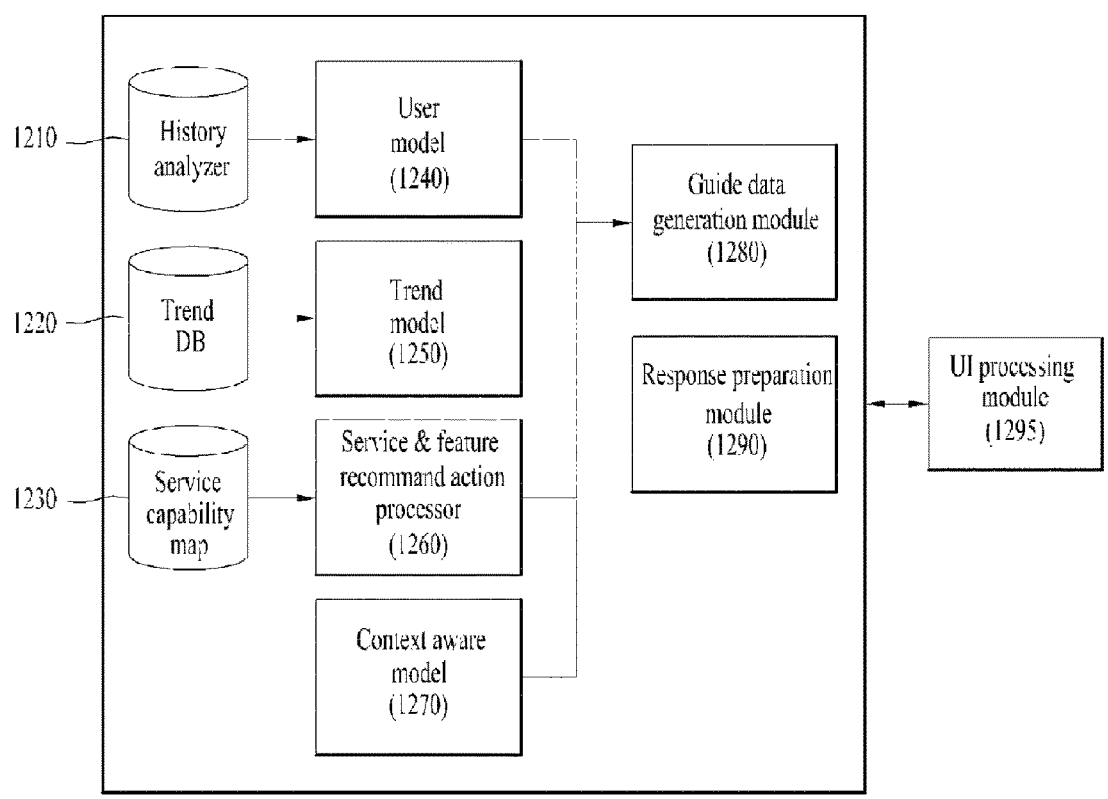
FIG. 12 is a block diagram showing an embodiment of a data processing configuration block of a terminal.

FIG. 12 is a block diagram showing an embodiment of a data processing configuration block of a terminal.

The data processing configuration block may be related to context data and/or guide data.

Referring to FIG. 12, the data processing configuration block includes a history analyzer 1210, a trend database 1220, a service capability map 1230, a user model processor 1240, a trend model processor 1250, a service and feature recommendation processor 1260, a context aware model processor 1270, a guide data generation module 1280, a response preparation module 1290 and a UI processing module 1295.

The context data processing configuration block of FIG. 12 may be included in or connected to the controller and controlled by the controller. Alternatively, FIG. 12 may correspond to the intelligent agent of the controller.

First, in the present specification, the context data refers to reference data which is directly or indirectly used for the guide data configuration according to the present invention, as described above.

Here, the guide data may include at least one of image, video, audio, text including one or more keywords or sentences, uniform resource locator (URL) data and a combination thereof.

The context data includes conversation history data of the user of the terminal. Here, the conversation history data may be collected via various messenger applications or telephone applications. The below-described context data including the history data may be collected indefinitely but is preferably collected during a predetermined period of time, such as a year, a month, a week or a day.

The context data includes pattern data according to application and service use history analysis. The pattern data may mean pattern data for attributes, use time and satisfaction level of an application used by the user and correlation between the application used by the user and another application.

The context data includes pattern data according to use or selection pattern analysis of other users having similar tendency based on basic data about the user. The basic data includes all data for identifying the user of the terminal, such as age, sex, hobby or preference, location, birthplace, personality, etc. The other users refer to other users who are registered with or are connected to an external server having one or more commonalities or similarities based on the basic data. In addition, the external server includes one or more servers (including a cloud server) which may be shared between or used by the same or similar terminal's users or provided by the manufacturer of the terminal. The context data may be used for the guide data configuration for the user of the terminal by referring to the context data of the other users of the external server.

The context data includes location data of the terminal and one or more link terminals connected to or capable of being connected to the terminal and use pattern data of functions or applications used for a predetermined time before the interactive service is executed. The location data is used to associate the environment where the user is located with a map application and to configure guide data necessary for the user based on the environment. For example, if the user of the terminal is currently located near a subway station, the terminal may configure and provide guide data such as subway time information, subway line information, information about transfer to a bus, subway exit information, or information about restaurants located near the subway station.

The context data further include data for accessing a function or application which is used not once or is not used by a predetermined number of times by the user among functions and applications provided by or installed in the terminal, image, moving image and text data received from at least one link terminal connected to or capable of being connected to the terminal.

The above-described context data may be independently used for the guide data configuration or a plurality of pieces of context data may be combined and used for the guide data configuration.

The context data means past data of a predetermined time based on a time when the application for the interactive service is executed. At this time, higher priority or weight is assigned to context data obtained at a time close to the application execution time or lower priority or weight is assigned to context data obtained at a time distant from the application execution time, such that context data coinciding with the current situation is collected and guide data is configured based on the context data.

In addition, weight or priority may be assigned to the past data of the context data based on a variety of data such as application use frequency, attributes, duration information, satisfaction data, etc. in addition to the time information.

The history analyzer 1210 analyzes history data collected for the above-described context data, generates analysis data based on commonalities or similarities and sends the analysis data to the user model processor 1240.

The trend database 1220 collects and temporarily stores trend data for the above-described context data and sends the trend data to the trend model processor 1250 according to request.

The service capability map 1230 collects information about capabilities of a service used by the terminal and generates and temporarily stores a map based on the collected data. The stored map data is sent to the service and feature recommendation processor 1260.

The user model processor 1240 configures a history data based user model of the user by referring to the generated analysis data and generates and sends data regarding the configured model to the guide data generation module 1280.

The trend model processor 1250 configures a trend model of the user of the terminal based on the received trend data and generates and sends data regarding the configured trend model to the guide data generation module 1280.

The service and feature recommendation processor 1260 analyzes the service used by the user of the terminal, service use pattern features, etc. based on the received map data and generates and sends data regarding a recommendation service to the guide data generation module 1280.

The context aware model processor 1270 configures a context aware model of the user of the terminal based on the aware context data and generates and sends data regarding the configured context aware model to the guide data generation module 1280.

The guide data generation module 1280 configures guide data by independently utilizing the received data or combining at least two pieces of context data. At this time, a plurality of pieces of guide data may be generated and the context data for the generated guide data or the combination of the context data may not be identical.

The response preparation module 1290 collects, configures, outputs response data according to user feedback, that is, guide data selection or user voice or text data input.

The UI processing module 1295 configures and outputs a necessary user interface via the above-described context data and data communication with the guide data processing configuration block.

FIGS. 13 to 16 are diagrams illustrating embodiments of implementing an interactive service according to the present invention.

On the application configuration screen for the interactive service according to the present invention, service data is output in the first area and a user interface for an input tool, a setting icon, etc. are output in the second area.

The service data includes initialization message, one or more pieces of guide data according to the present invention, text data converted from user input, response data according to user selection, etc.

As described above, the guide data and the response data excluding the text data converted from user input of the service data may be image, video, audio, text, uniform resource locator (URL) data, etc.

According to the present invention, when the interactive service is provided according to application execution, an initial message may not be provided.

Figure 13:
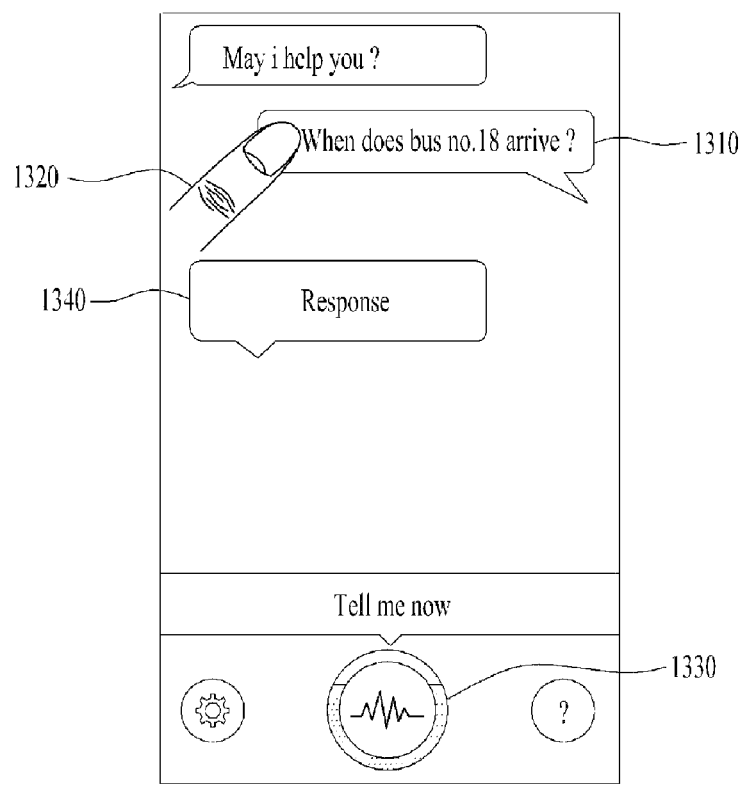
FIGS. 13 to 16 are diagrams illustrating embodiments of implementing an interactive service according to the present invention.

Referring to FIG. 13, in service data of a first area, one or more pieces of guide data and text data converted from user input are distinguished from response data. In FIG. 13, when the guide data 1310 of the first area is output and the user selects the guide data via a pointer 1320, the terminal configures and outputs at least one piece of response data 1340 below the output guide data 1310.

Although the guide data 1310 is selected via the pointer 1320, the guide data may be selected via a voice command via the user interface 1330 for the input tool of the second area. The same is true in selection and function execution of the response data 1340.

For example, in FIG. 13, the terminal provides one piece of guide data 1310 in a predetermined area of the screen according to execution of an application for an interactive service without user input and provides one piece of response data 1330 according to selection of the guide data 1310.

Figure 14:
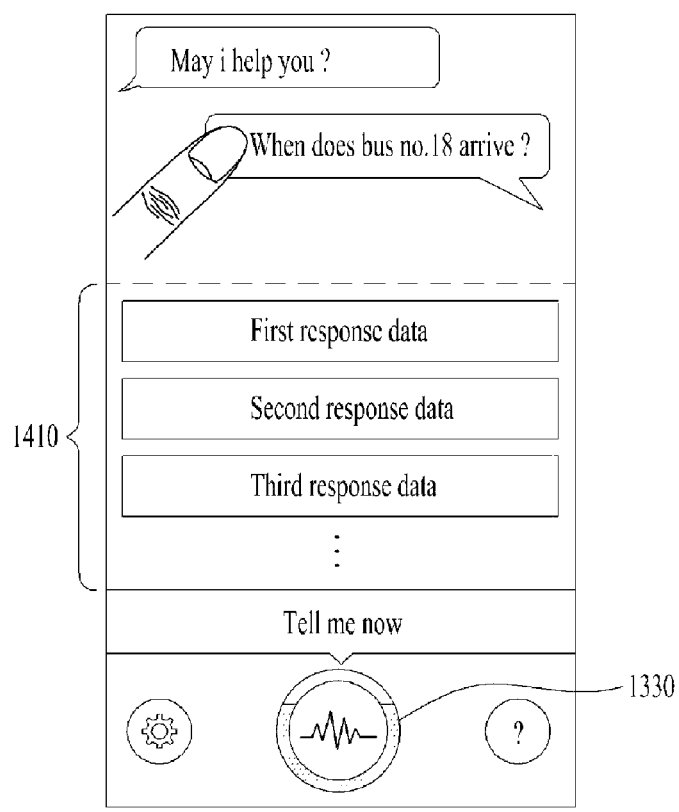

The method of FIG. 14 is similar to the method of FIG. 13 but is different therefrom in that a plurality of pieces of response data is provided as opposed to one piece of response data. At this time, when the plurality of pieces of response data is provided, the terminal provides a dotted line in a part, in which the response data starts, of the screen in a horizontal direction, for being distinguished from the guide data 1310, and outputs the plurality of pieces response data below the guide data, such that the guide data and the response data 1410 are easily and conveniently distinguished.

Figure 15:
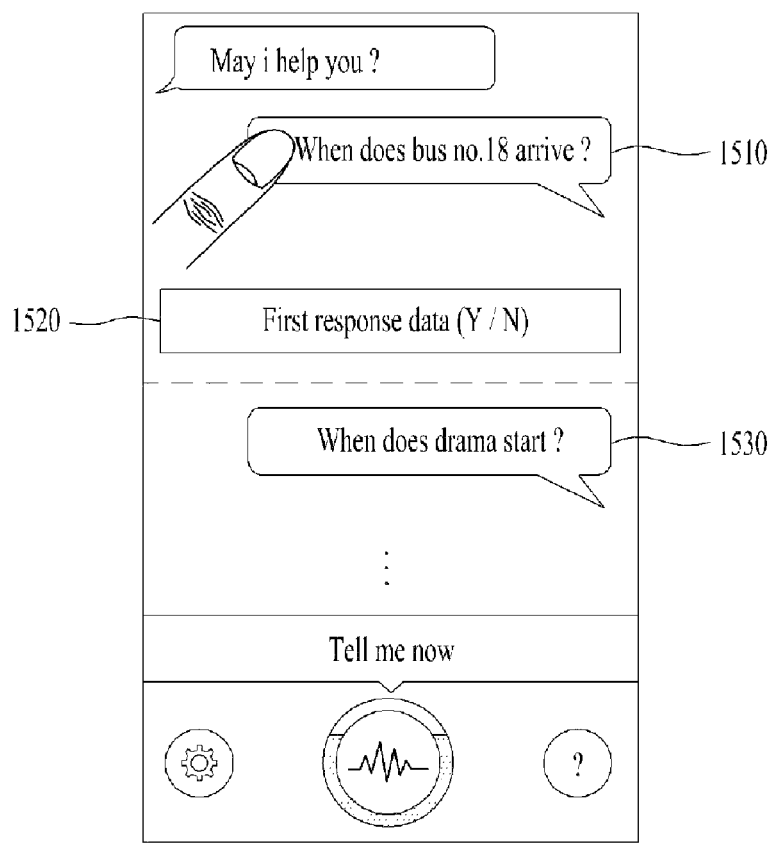

Referring to FIG. 15, one piece of guide data 1510 is provided and one piece of response data 1520 is output according to selection of the guide data 1510 by the user.

The terminal may receive user input for selecting the response data 1520 when providing the response data 1520. That is, when the user rejects the response data 1520, the terminal may provide new guide data 1530 or confirm whether user input is received during a predetermined time and await user input.

Thereafter, when user input is not received during the predetermined time, the terminal provides new guide data 1530.

At this time, in order to distinguish between the first guide data 1510 and first response data 1520 thereto and the newly provided second guide data 1530 and second response data (not shown) to be provided later, a dotted line is provided before providing the second guide data 1530.

Figure 16:
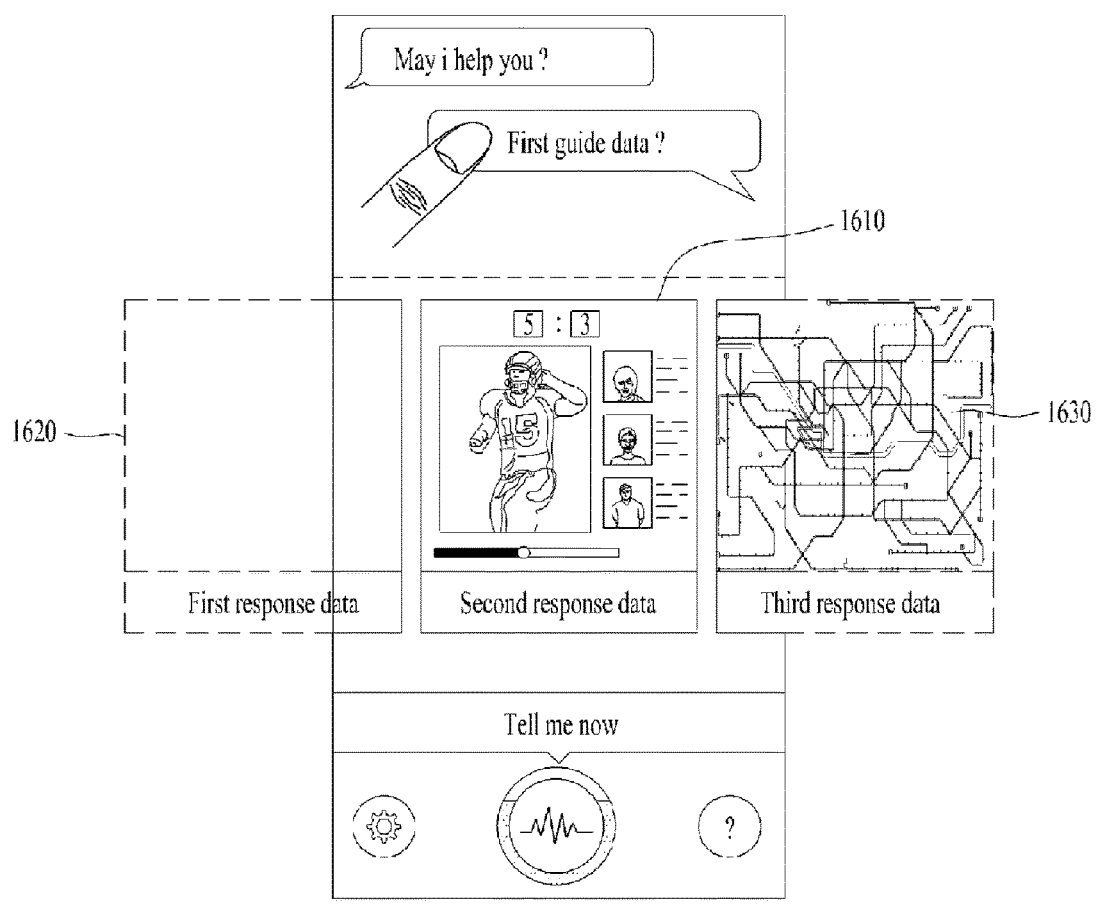

FIG. 16 shows a user interface configured such that response data 1610, 1620 and 1630 may be selected via left-and-right flicking.

The first response data 1610 is, for example, a web page, the second response data 1620 is moving image data and the third response data 1630 is image data.

At this time, when the user performs left-and-right flicking using a finger, a stylus, etc., the terminal sequentially provides the response data.

When the user needs to delete or re-search the response data after the response data is provided, the terminal may provide an end button (not shown) in a predetermined area of the user interface. Alternatively, when the user reselects or taps the guide data forming the foundation of the response messages during a predetermined time or more, some or all of the response messages may be removed. This is applicable to the response data or converted text data. In other words, when the same data is reselected, a user interface related to data deletion may be provided via a popup window related to deletion of the data to perform a control operation.

The terminal does not continuously provide new guide data when the guide data is not selected. For example, when the user ends the application for the interactive service, new guide data is not provided. When the guide data is provided five times or more but is not selected by the user, the terminal may send a command to reconfigure the guide data via the controller.

Accordingly, the controller may reconfigure the guide data based on the collected context data. In this case, the controller may compare the reconfigured guide data with the previously provided guide data and control recollection of the already collected context data when the reconfigured guide data and the previously provided guide data have a predetermined range of similarities.

When the guide data reconfiguration command is received, the controller does not reconfigure the guide data based on the already collected context data but deletes the already collected context data and recollect the context data from the time when the reconfiguration command is received. In this case, the newly collected context data may include the already provided guide data and user feedback data thereof.

According to at least one of the embodiments of the present invention, when the interactive service is used, the user can easily and conveniently use the interactive service via the guide data without inputting voice and text.

According to at least one of the embodiments of the present invention, by providing the guide data based on the context data, it is possible to provide an adaptive interactive service in accordance with user's intention or needs.

The effects of the present invention are not limited to the above-described effects and other effects which are not described herein will become apparent to those skilled in the art from the following description.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The present invention relates to a terminal and a method for controlling the same and is applicable to all terminals including a fixed terminal and a mobile terminal.

The invention claimed is:

1. A method for controlling an application in a terminal, the method comprising:
   collecting first context data;
   in response to execution of an application, displaying an application configuration screen based on the first context data of the terminal;
   controlling the terminal according to a user selection from the application configuration screen;
   displaying first guide data in a first area of the configuration screen based on the first context data;
   determining whether a user input selecting the first guide data is received within a predetermined time;
   deleting the first context data and generating second context data and outputting second guide data based on the second context data in the first area when it is determined that the user input selecting the first guide data is not received within the predetermined time;
   in response to receiving a left flicking input or a right flicking input to select the first guide data from the user, sequentially displaying any one of a first response data, a second response data, and a third response data according to the left flicking input or the right flicking input;
   in response to receiving a reconfiguration command from the user, deleting the first context data and regenerating the second context data from a time when the reconfiguration command is received,
   wherein the second context data includes the first context data and user feedback data corresponding to the first context data,
   wherein each of the first response data, the second response data, and the third response data corresponds to the first guide data,
   wherein the first response data includes a web page, the second response data includes a video, and the third response data includes an image,
   wherein the application configuration screen includes the first area outputting service data and a second area outputting at least one of an input tool and a setting icon,
   wherein the service data indicates an initial message, first guide data and the response data in accordance with a user selection, and
   wherein the first guide data indicates at least one of text data, image data and video data.

2. The method according to claim 1, wherein the controlling the application includes switching the application configuration screen to a screen corresponding to selected guide data when the user selects the first guide data or second guide data output in the first area.

3. The method according to claim 1, wherein the first guide data further includes audio, and the text data includes one or more keywords or sentences, uniform resource locator (URL) data and a combination thereof.

4. The method according to claim 1, wherein the application is executed by an intelligent agent and the application includes an application for an interactive service.

5. The method according to claim 1, wherein the first context data includes a conversation history of the user, pattern data according to application and service use history analysis, pattern data according to use or selection pattern analysis of other users having similar tendency based on basic data about the user, location data of the terminal and one or more link terminals connected to or capable of being connected to the terminal and use pattern data of functions or applications used for a predetermined time before an interactive service is executed or a combination thereof.

6. The method according to claim 1, wherein the first context data includes data for accessing a function or application which is used not once or is not used by a predetermined number of times by the user among functions and applications provided by or installed in the terminal, image, moving image and text data received from at least one link terminal connected to or capable of being connected to the terminal.

7. A terminal for controlling an application, the terminal comprising:
   a receiver configured to receive a request for executing the application from a user;
   a controller configured to:
   collect first context data,
   in response to execution of the application, display an application configuration screen based on first context data of the terminal,
   control the terminal according to a user selection from the application configuration screen,
   display first guide data output in a first area based on the first context data,
   determine whether a user input selecting the first guide data is received within a predetermined time,
   delete the first context data and generate second context data and output second guide data based on the second context data in the first area when it is determined that the user input selecting the first guide data is not received,
   in response to receiving a left flicking input or a right flicking input to select the first guide data from the user, sequentially display any one of a first response data, a second response data, and a third response data according to the left flicking input or the right flicking input, and
   in response to receiving a reconfiguration command from the user, delete the first context data and regenerate second context data from a time when the reconfiguration command is received,
   wherein the second context data includes the first context data and user feedback data corresponding to the first context data,
   wherein each of the first response data, the second response data, and the third response data corresponds to the first guide data,
   wherein the first response data includes a web page, the second response data includes a video, and the third response data includes an image; and
   an output unit,
   wherein the application configuration screen includes the first area outputting service data and a second area outputting at least one of an input tool and a setting icon,
   wherein the service data indicates an initial message, guide data and the response data in accordance with a user selection, and
   wherein the guide data indicates at least one of text data, image data, and video data.

8. The terminal according to claim 7, wherein the controller switches the application configuration screen to a screen corresponding to selected guide data when the user selects the first guide data or second guide data output in the first area.

9. The terminal according to claim 7, wherein the first guide data further includes audio, and the text data includes one or more keywords or sentences, uniform resource locator (URL) data and a combination thereof.

10. The terminal according to claim 7, wherein the controller executes and controls the application via an intelligent agent and the application includes an application for an interactive service.

11. The terminal according to claim 7, wherein the first context data includes a conversation history of the user, pattern data according to application and service use history analysis, pattern data according to use or selection pattern analysis of other users having similar tendency based on basic data about the user, location data of the terminal and one or more link terminals connected to or capable of being connected to the terminal and use pattern data of functions or applications used for a predetermined time before an interactive service is executed or a combination thereof.

12. The terminal according to claim 7, wherein the first context data includes data for accessing a function or application which is used not once or is not used by a predetermined number of times by the user among functions and applications provided by or installed in the terminal, image, moving image and text data received from at least one link terminal connected to or capable of being connected to the terminal.

* * * * *